United States Patent [19]
Phillips et al.

[11] 3,975,347
[45] Aug. 17, 1976

[54] LINEAR DIMETHYLAMINE-EPICHLOROHYDRIN COPOLYMER

[75] Inventors: K. G. Phillips, River Forest; W. E. Zarnecki, Worth, both of Ill.

[73] Assignee: Nalco Chemical Company, Oak Brook, Ill.

[22] Filed: Nov. 11, 1974

[21] Appl. No.: 522,381

[52] U.S. Cl. .................... 260/29.2 EP; 260/2 BP
[51] Int. Cl.² ................... C08J 3/02; C08L 63/00
[58] Field of Search ............ 260/29.2 N, 29.2 EP, 260/2 BP

[56] References Cited
UNITED STATES PATENTS

| | | |
|---|---|---|
| 3,224,986 | 12/1965 | Butler et al. ............... 260/29.2 EP |
| 3,577,313 | 4/1971 | Bolger ........................ 260/2 BP |
| 3,738,945 | 6/1973 | Panzer ........................ 260/2 BP |
| 3,769,250 | 10/1973 | Nikles, Jr. ................ 260/29.2 EP |

Primary Examiner—J. Ziegler
Attorney, Agent, or Firm—John G. Premo; Robert A. Miller; Barry W. Sufrin

[57] ABSTRACT

A process for preparing high molecular weight substantially linear condensaton polymers of lower aliphatic secondary amines and difunctional epoxide compounds in concentrations of from 60-85% by weight in aqueous solution is disclosed.

6 Claims, No Drawings

LINEAR DIMETHYLAMINE-EPICHLOROHYDRIN COPOLYMER

This invention relates to polyquaternary compounds of high molecular weight and high concentration which are substantially linear. More particularly, the invention relates to polyquaternary compounds derived from secondary amines and difunctional epoxy compounds.

The use of polyamines and specifically polyquaternary compounds in various industrial applications are well known. Among the applications in which these compounds are used include the treatment of municipal wastes such as sewage, the removal of both fine inorganic and organic matter from industrial and municipal water supplies, the coagulation of rubber latices and other similar applications.

Cationic flocculants such as the water soluble polyquaternary compounds which are the subject of our invention have been found increasingly important in these areas. However, up to this point these compounds have not been prepared at high concentrations and have usually had a lower molecular weight necessitating the addition of difunctional amino compound to cross link the polymer in order to obtain substantial activity.

The prior art on the preparation of polyquaternary compounds from secondary amines and difunctional epoxide compounds is well known and is probably best illustrated by Panzer et al. U.S. Pat. No. 3,738,945 who discloses a means for the preparation of "high molecular weight" polyquaternary compounds from secondary amines and difunctional epoxides. Panzer, however, performs his reaction at a lower temperature and requires a period of time after his reactants have been added together at a high temperature in order to make his product. Panzer also makes his polymers dilute which can add significantly to shipping cost as well as warehousing and storage cost. Our invention relates to the formation of novel polyquaternary compounds in high concentration being substantially linear and of high molecular weight which overcame the above disadvantages of Panzer.

OBJECTS

An object of this invention is to provide to the art a process for the preparation of high molecular weight substantially linear polyquaternary compounds.

A further object of this invention is to provide to the art a process for the preparation of high molecular weight substantially linear polyquaternary compounds made from secondary amines and difunctional epoxides. A still further object of this invention is to provide to the art a process for the preparation of high molecular weight substantially linear condensation polymer of dimethylamine-epichlorohydrin in high concentrations in aqueous media.

THE INVENTION

The process of our invention involves heating a 50 to 90% aqueous solution of a lower aliphatic secondary amine to a temperature of 75°C to 95°C with agitation; and then, adding to the heated aqueous solution of the lower aliphatic secondary amine a difunctional epoxide compound in a mole ratio of epoxide compound to secondary amine of from 0.75:1 to 1:1 at a rate sufficient to maintain the reaction temperature from 75°C to 95°C with agitation whereas the concentration of the polymer prepared from said amine and said epoxide compound is from 60 to 85% by weight in water.

THE SECONDARY AMINES

The secondary amines used in our invention preferably contain between 2 to 8 carbon atoms. Among the secondary amines used in my invention are dimethylamine, ethylmethylamine, diethylamine, propylmethylamine, propylethylamine, dipropylamine, dibutylamine, propylbutylamine, ethylbutylamine, methylbutylamine, pentylethylamine, pentylethylamine, and pentylpropylamine. Other amines maybe used, however, it is important that the amine be relatively short chained due to reactive concentrations and as well as solubility in water.

While it is not absolutely necessary in the use of our invention, the secondary amine chosen should be water soluble and should react easily with a difunctional epoxide compound. With some of the amines listed above and most notably with dimethylamine, high concentrations such as those listed above may be maintained only by the use of pressurized equipment since these amines are gases at room temperature.

THE DIFUNCTIONAL EPOXIDE COMPOUNDS

The difunctional epoxide compounds useful for the purpose of our invention are those which contain an epoxide group which is readily broken in a condensation polymerization reaction as well as another reactive functional group such as an halide. Examples of compounds which are useful in my invention epihalohydrins such as include epichlorohydrin, epibromohydrin and epiiodohydrin. These compounds should not be over six carbon atoms in length and should not contain more than two reactive sites due to the possibility of cross linking which is undesirable during the course of the reaction.

THE REACTION

In the preferred embodiment of our invention the temperature of reaction should be kept as high as possible while not removing any reactant or water from the reaction vessel. Preferred temperatures are those between 60 to 90°C. A more preferred temperature range is 70° and 85°C. The most preferred temperature is between 75° to 85°C. In our process it is important to heat the aqueous solution of the secondary amine to the reaction temperature before adding the difunctional epoxide compound. Once the addition of the difunctional epoxide compound has begun, and the rate properly adjusted the temperature will maintain itself at the desired level without cooling or heating due to the exothermic reaction which takes place between the amine and difunctional epoxide. It is important in the concept of our invention to adjust this rate to maintain a constant temperature.

Another significant reason for using high temperatures in the course of our invention is in that the viscosity of the resulting high concentration polymer will be less at elevated temperature than at cooler temperatures and thus a better reaction is perfected due to the agitation which can be provided. A further reason for the use of high temperatures is in that a high molecular weight polymer which is substantially uncrossed linked and thus linear in structure can be formed at these temperatures when using high concentrations of reactants.

The concentration of the secondary amine employed should be in the order of 60 to 90% in aqueous solution. It is important that some water be present due to the use of water as a solvent during the reaction, but it is unnecessary and undesirable to have large quantities of water during the course of the reaction due to dilution of the final product, and the formation of branched structures. Typically, when dimethylamine, the preferred secondary amine in my invention is used it will be at a concentration of from 55 to 65% in water. Ideally, a concentration of between 60 to 65% is preferred.

We have found it important to add the difunctional epoxide compound to the heated aqueous solution of the secondary amine in order to obtain high molecular weight linear polymer. In the addition of the difunctional epoxide to the secondary amine the normal molar ratio of epoxide to secondary amine should be between 0.75 to 1 to 1:1. It is important that no extra difunctional epoxide be added due to the possibility of cross linking the resultant polymer and thus obtaining a product of substantially lower activity. The normal ratios of the two reactants will vary according to the end use product is put to. As an example, a molar ratio of 0.75:1 to 0.85:1 (secondary amine difunctional epoxide) is preferred for producing a polymer of high activity in the coagulation of rubber latices. For clarification applications including the coagulation and flocculation of industrial and municipal wastes a molar ratio of substantially 1.0 to 1.0 is preferred.

THE METHOD

In the method of our invention the aqueous solution of the secondary amine is charged to a reactor and with agitation is heated to a temperature of from 75° to 95°C. Upon reaching a stable temperature, the difunctional epoxide compound is added incrementally so as to maintain the desired temperature without providing either heating or cooling to the reaction. Also the end of the addition of the epoxide compound, the reactants are usually held within the reaction vessel for a short period of time that it requires for the reactor to cool. This time is usually minimal and is done as a matter of convenience rather than as a necessity since the reaction is substantially completed upon the addition of the final amount of the difunctional epoxide.

In order to better illustrate our invention the following examples are presented.

EXAMPLE 1

To a 20 gallon glass reactor equipped with cooling and heating capabilities was charged 75.2 pounds of 60% dimethylamine in water. The amine solution was added to 173°F (78.3°C) at which time the incremental addition of 92.5 pounds of epichlorohydrin was started. The addition of the epichlorohydrin to the amine was made over a period of three hours and 39 minutes while maintaining the temperature of the reactant vessel between 173° to 177°F. After all the epichlorohydrin had been added the reactor was allowed to cool for 30 minutes at which time it had reached a temperature of 143.8°F. The material had a preferred viscosity of 22,400 cps at 80°F. The resulting polymer contained 31.8% carbon 71.8% nitrogen and contained 75% polymer solids.

EXAMPLE 2

To a 20 gallon glass reactor was charged 22.9 pounds of Chicago tap water followed by 75.2 pounds of a 60% aqueous solution of dimethylamine. The reactor was sealed and the aqueous amine mixture was added to 173°F at which time 78.6 pounds of epichlorohydrin was started into the reactor. At the end of 191 minutes all of the epichlorohydrin had been added keeping the temperature of the reactor in the range of 173° to 177°F. At the end of epi addition the material was held in the reactor for one and a half hours and then cooled to below 100°F. The viscosity of the resulting polymer was 545 cps at 25°C.

EXAMPLE 3

To a 100 gallon reactor was charged 429 pounds of a 25% aqueous solution of dimethylamine. This solution was then added to a temperature of 47° to 48°C at which time the addition of 221 pounds of epichlorohydrin was started into the reactor. The temperature was maintained at 47° to 48°C with cooling as necessary and the epichlorohydrin addition took 4 hours and 12 minutes. At the end of this period of time the reactor was heated to a temperature of 68°C and held at this level for 2 hours with agitation at which time the product was removed. The resulting product had a viscosity of 42 cps at 25°C.

This procedure substantially duplicates Panzer in that a low molecular weight polymer even at a one to one mole ratio is formed due to the low temperature and low solids level within the reactor.

EXAMPLE 4

Samples drawn during the preparation of Example 1 were tested in the coagulation of a commercial styrenebutadiene rubber latice. The four samples evaluated had molar ratios of epichlorohydrin to dimethylamine of a 0.75, 0.87, 0.93, and 1.0. The sample with the epichlorohydrin-dimethylamine molar ratio of 0.87 exhibited superior activity as compared to the other samples evaluated. It is noted that the material of a one to one molar ratio performed better in water clarification applications.

We claim:

1. A process for the preparation of a 60 to 85% aqueous solution of a substantially linear polymer of a lower aliphatic secondary amine containing 2 to 8 carbon atoms having one amino group with an epihalohydrin said process comprising the steps of:
   A. Heating a 50 to 90% aqueous solution of said lower aliphatic secondary amine to a temperature of 75°C to 95°C with agitation; and then,
   B. Adding to said heated aqueous solution of a lower aliphatic secondary amine an epihalohydrin in a mole ratio of epihalohydrin to secondary amine from 0.75:1 to 1:1 at a rate sufficient to maintain the reaction temperature between 75°C to 95C with agitation whereby the concentration of the amine and epihalohydrin is from 60 to 85% by weight in an aqueous solution, and then,
   C. Recovering said 60 to 85% solution of a substantially linear polymer of a lower aliphatic secondary amine and an epihalohydrin.

2. The process of claim 1 wherein the molar ratio of the epihalohydrin to the secondary amine is 0.80:1.

3. The process of claim 1 wherein the molar ratio of the epihalohydrin to the secondary amine is 1:1.

4. The process of claim 1 wherein the molar ratio of epihalohydrin to the secondary amine is 0.87:1.

5. The process of claim 1 wherein the lower aliphatic secondary amine is dimethylamine.

6. The process of claim 1 wherein the temperature of reaction is about 80°C (176°F).

* * * * *